United States Patent
Bowden et al.

(10) Patent No.: US 8,425,062 B2
(45) Date of Patent: Apr. 23, 2013

(54) FRONT LIT DISPLAY UNIT

(75) Inventors: Upton Beall Bowden, Canton, MI (US); Martin Green, Essex (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 577 days.

(21) Appl. No.: 12/711,361

(22) Filed: Feb. 24, 2010

(65) Prior Publication Data

US 2010/0220493 A1   Sep. 2, 2010

(30) Foreign Application Priority Data

Feb. 27, 2009   (GB) .................................. 0903511.4

(51) Int. Cl.
*G01D 11/28*   (2006.01)
(52) U.S. Cl.
USPC ............. 362/23.01; 362/23.2; 362/560
(58) Field of Classification Search ............ 362/23, 362/27, 26, 613, 612, 555, 551
See application file for complete search history.

(56) References Cited

U.S. PATENT DOCUMENTS

| | | | |
|---|---|---|---|
| 3,524,789 A | 8/1970 | Olsen | |
| 4,373,282 A | 2/1983 | Wragg | |
| 5,204,160 A | 4/1993 | Rouser | |
| 5,671,994 A | 9/1997 | Tai et al. | |
| 6,450,656 B1 * | 9/2002 | Noll | 362/23 |
| 7,503,666 B2 * | 3/2009 | Tamura | 362/26 |
| 7,537,353 B2 * | 5/2009 | Birman et al. | 362/23 |
| 7,677,744 B2 * | 3/2010 | Birman et al. | 362/29 |

FOREIGN PATENT DOCUMENTS

| | | |
|---|---|---|
| JP | 2002/311432 A | 10/2002 |
| JP | 2003/272425 A | 9/2003 |
| WO | WO 01/02772 A1 | 1/2001 |
| WO | WO 02/081965 A1 | 10/2002 |
| WO | WO 2008/016978 A1 | 2/2008 |

* cited by examiner

*Primary Examiner* — Anabel Ton
(74) *Attorney, Agent, or Firm* — Fraser Clemens Martin & Miller LLC; J. Douglas Miller

(57) ABSTRACT

A display unit illuminated from in front of a display area, the display unit including a display area for presenting visual information to a user of the unit, a lens element spaced apart from and extending across the display area, and a source of illumination at a peripheral edge of the lens element for providing front illumination of the display area.

20 Claims, 1 Drawing Sheet

FRONT LIT DISPLAY UNIT

CROSS-REFERENCE TO RELATED APPLICATION

This application claims priority to United Kingdom Patent Application No. 0903511.4 filed Feb. 27, 2009, the entire disclosure of which is hereby incorporated herein by reference.

FIELD OF THE INVENTION

The present invention relates to a display unit that is illuminated from in front of a display area.

BACKGROUND OF THE INVENTION

As an alternative or in addition to backlighting, displays may be provided with front lighting, used to provide direct or indirect illumination on a front side of a display area. Compared with back lighting, front lighting offers different light effects. Because of this, a variety of front-lit display techniques have been used in automotive display units.

Backlighting is normally provided through a transmissive appliqué. Liquid crystal displays may be either front lit or back lit. Front lighting is normally used without backlighting when a display area is opaque. Metal foil display areas are an example of a type of display where it is not possible to provide backlighting through an opaque display area.

It can be difficult to achieve uniform lighting in a front lit display, owing to the position of the light sources, which will usually be around the periphery of the display area. Multiple light emitting diodes or several light pipes may be mounted in front of the display area with a hoods or a mask to hide the light sources from view and to direct the emitted light towards the display area. Sometimes, smoked lens material is used to control light from the front lighting arrangement, either to even out perceived imbalances in the front illumination or to reduce the intensity of stray light directed towards the display area.

A secondary issue is front light clusters emit too much light into the cabin, lowering the contrast ratio of the illuminated display area. Additionally, the performance of front lighting can be adversely affected by bright ambient light. This is a particular issue with automotive display units, which may be used in conditions where sunlight is present in the vicinity of the display unit. When sunlight is present, it may not be possible for the driver to view alphanumeric or graphical information presented by a speedometer or engine speed (rpm) indicator of the display unit.

It is an object of the present invention to provide a more convenient front lit display, which deals with these limitations.

SUMMARY OF THE INVENTION

According to the invention, there is provided a display unit comprising a display area for presenting visual information to a user of the unit, a lens element spaced apart from and extending across the display area, and a source of illumination for providing front illumination of the display area, wherein: the lens element has a peripheral edge; the source of illumination is arranged to project light into one or more sections of the peripheral edge; the lens element has opposite inner and outer surfaces relative to the display area, the surfaces acting as a light pipe to convey the projected light through the lens element by means of multiple internal reflections off alternate inner and outer surfaces; the light pipe comprises light deflecting means for deflecting a portion of the conveyed light so that the portion can escape from the inner surface of the light pipe to illuminate the display area; the inner surface of the lens element is coated with a light collimating film to control the direction of the deflected light towards the display area; the outer surface of the lens element is coated with a reflecting layer that helps, when the deflected light is incident on the outer surface, to reflect the deflected light back towards the inner surface; and the reflecting layer permits light from the illuminated display area generated by the front illumination to pass through the reflecting layer so that a user can view the illuminated display area.

This arrangement is particularly suitable to a low cost front illuminated display, as the reflecting layer and the light collimating film are of unitary, or one-piece, construction with the lens element, thereby forming a unitary lens element assembly. This simplifies the mechanical construction of the display unit as there is no need for multiple separate optical components to provide the front illumination.

In another embodiment of the invention, the reflecting layer is partially reflecting to the deflected light when incident on the outer surface and is partially transmitting to light from the illuminated display area generated by the front illumination.

The light from the source of illumination may be visible or ultraviolet (UV) radiation.

The front illumination may comprise ultraviolet light, in which case the display area will include features that convert the UV front lighting into visible light that passes through the reflecting layer so that a user can view those features on the illuminated display area.

The light collimating film may be a light louver material.

The light collimating film may be provided as a film which may be self adhesive and which is applied to the inner surface of the lens element. The partially reflective layer may also be provided as a film that may be self-adhesive and that has a partially reflective mirrored layer, preferably provided on an inner side of the film with respect to the lens element. The partially reflective mirrored layer may be a vacuum deposited layer of aluminum having a thickness below that needed to achieve bulk reflectivity.

The deflecting means serves to interrupt the passage of the light down the light pipe formed by the inner and outer surfaces of the lens element, and to deflect the light so that it may exit the inner surface and be directed by the light collimating film towards the display area. One example of a deflecting means is a fluorescent dye that absorbs the conveyed light and re-emits the light across a range of angles. Such dyes can be incorporated in a polymeric lens element and can re-radiate absorbed optical radiation as a longer wavelength, typically in all directions.

Another way of providing deflecting means is to provide a micro-texture to the outer surface of the lens element to scatter a proportion of light incident on the outer surface. The micro-texture can be a surface roughening having a typical dimension of between about 1 and 10 wavelengths of the light conveyed by the light pipe.

BRIEF DESCRIPTION OF THE DRAWINGS

The invention will now be further described, by way of example only, and with reference to the accompanying drawings, in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
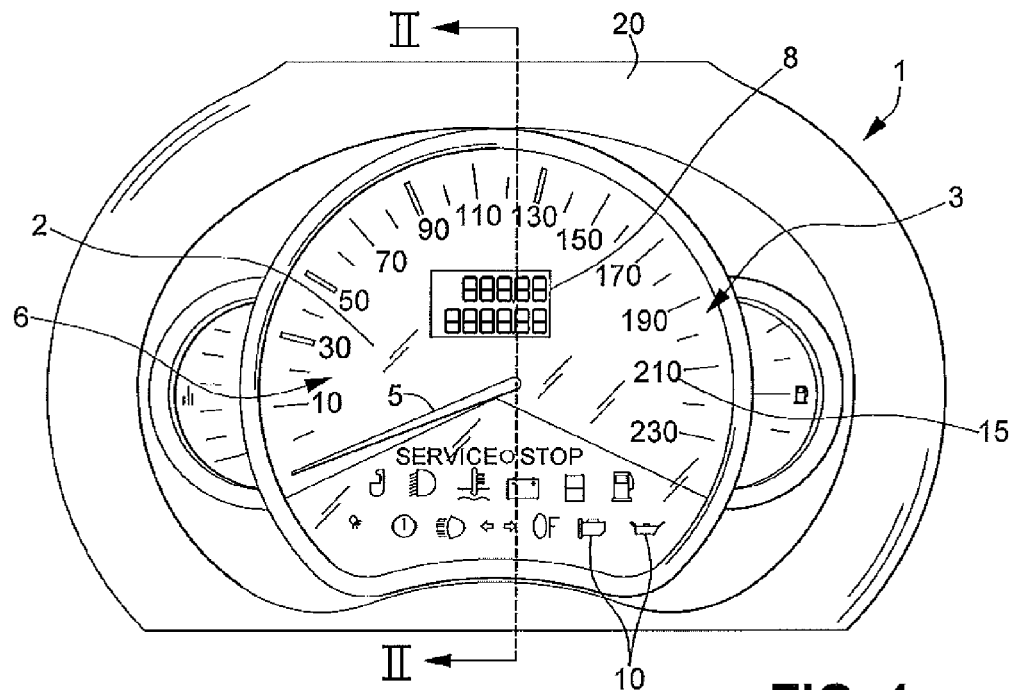
FIG. 1 is a plan view of an automotive display unit having a front illuminated display area.

FIG. 1 shows an automotive main display unit 1 having a dial display 3 with a main display area 6 having a metal display panel 2 on which are a plurality of display indicia 15. A center dial 5 is provided to show indicated display indicia. Because the metal display area 2 and indicia 15 are not transparent or translucent, this portion of the display area needs to be illuminated from the front of the display area.

The display area 6 may include other display elements than are back lit for example a liquid crystal display 8 and warning light symbols 10.

Figure 2:
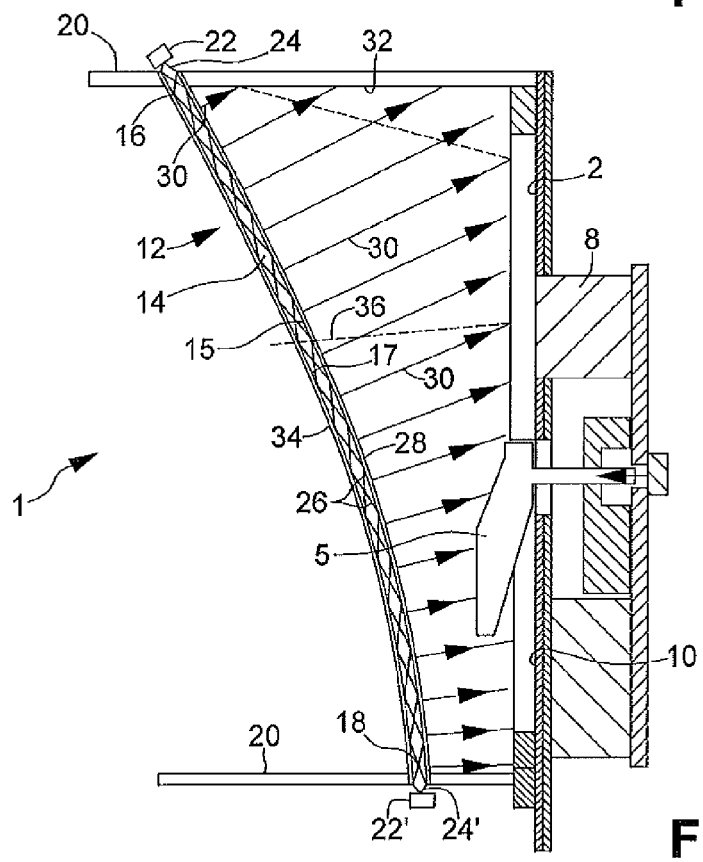
FIG. 2 is a cross-sectional view of the display unit, taken through Line II-II of FIG. 1 showing a front illumination system for the display area.

FIG. 2 shows in cross-section the construction and operation of the display unit 1, in particular how the metallic display panel 2 is front lit.

The display unit includes a lens element assembly 12, based around a transparent lens element 14 that is formed from PMMA sheet material. The lens element 14 is curved in one plane into a parabolic or elliptical shape convex to the display area 6 and is angled forwards at a top end 16 towards a driver (not shown) and away from the driver at a bottom end 18. The lens element is held in shape by a surrounding frame 20 of the display unit 1. The lens element 14 has inner and outer surfaces 15, 17 that are separated by a substantially constant distance.

A peripheral edge of the lens element 14 at the top and bottom ends of the lens element 14 are positioned to receive light 24, 24' from top and bottom light sources 22, 22'. The light sources 22, 22' are here an array of blue/green light emitting diodes (LEDs). Optionally, light sources may be provided, either additionally or alternatively, at the left and/or right sides of the lens element 14.

Light 24, 24' is conveyed away 26 from the sources 22, 22' by the lens element 14 which acts as a light pipe owing to multiple internal reflections from the inner and outer surfaces 15, 17.

In one embodiment of the invention, the opposite inner and outer surfaces 15, 17 of the lens element 14 in this example are both smooth. The lens element includes a fluorescent dye, optionally also including a pigment. For example, the combination of a fluorescent dye possessing yellow fluorescence with a green pigment, for example copper phthalocyanine green, can be used to produce a fluorescent brilliant green, which is radiated in all directions along the length of the light pipe formed by the lens element 14.

Light 24, 24' is provided at opposite ends 16, 18 of the lens element 14 to help even out the light intensity along the length of the lens element 14 in the plane of FIG. 2. It may also be possible to even out the illumination over the full extent of the lens element 14 by angling each of the individual light sources 22, 22' differently with respect to the plane of the drawing shown in FIG. 2.

In an alternative embodiment, the outer surface 17 is provided with a micro-texture, which also disrupts the transmission of light down the light pipe formed by the lens element.

The inner surface is covered with a light louver film 28, called 3M Vikuiti (Reg. TM) film sold by 3M, of St. Paul, Minn., USA. Such louver films are made by the skiving process described in U.S. Pat. No. 3,524,789. Other light transmissive films which can also service to collimate light have grooves or channels that are filled or coated with a light absorbing material are described, for example, in U.S. Pat. No. 5,204,160.

As can be seen from FIG. 2 the effect of the light louvers follow the curvature of the lens element 14. When light sources 22, 22' at opposite edges of the lens element are used, the light louvers are preferably approximately perpendicular to the lens inner surface 15. If the light source 22 or 22' is just provided along one edge, then this is preferably the edge closest to the portion of the display 6 to be front lit. The light louvers work in both directions, so the angle of the light louvers does, however, need to be orientated such that the light 36 returned from the display area is able to reach the viewer of the display.

The light collimating film 28 serves to channel scattered or re-radiated light from the lens element 14 in a direction towards 30 the display area 6. Optionally, internal surface portions 32 of the frame 20 may be mirrored to help concentrate channeled light 30' that would otherwise miss the display area 6.

The outer surface 17 of the lens element 14 is covered by a partially mirrored film layer 34 having about 50% reflectance to internal scattered or re-radiated light. The transmissivity of the partial mirror film 34 may also be around 50% to light 36 reflected off of the front illuminated display area 6. This reduces light exiting the lens element 14 towards the driver.

It should be noted that the angle of the light louvers 28 does need to be orientated such that the light 36 from the display area is not blocked from reaching the user's eyes.

The partially mirrored film 34 and light louver film 28 form an integral structure with the lens element, which is sandwiched between these layers, to form the lens element assembly 12 which is robust an inexpensive to mass produce.

The invention can also make use of light sources having different wavelengths from those mentioned above. For example, the light sources may be multicolored so that the color of the front light changes across the extent of the display area. One way in which this may be done is by providing light having one color at one edge and a different color at the opposite edge. Another possibility is to use three color LEDs, with individually controllable red, green and blue LED emitters, so that the front light color is selectable by a user of the display unit.

Another possibility is to use a UV light sources, for example UV LEDs. The UV light is then used with phosphorescent inks on the display area, which glow in a visible color, or a range of different visible colors. A particular advantage of this arrangement is that any UV light which escapes from the lens element will not be visible to a user of the device. It may also be possible to use a dichroic reflector layer 34 to retain more of the UV light within the lens element.

Although the invention has been described in terms of a main display unit for an automobile, the invention is applicable to other types of display unit, whether used in a vehicle (for example a display used in a central portion of a vehicle dashboard) or in a non-automotive situation.

The invention therefore provides a convenient an economical front lit display unit.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A display unit comprising:
   A display area for presenting visual information to a user of the display unit;
   a lens element spaced apart from and extending across the display area, the lens element including a peripheral edge and opposite inner and outer surfaces relative to the display area, wherein the inner surface is coated with a light collimating film and the outer surface is coated with a partially reflective layer; and
   a source of illumination arranged to project light into the peripheral edge of the lens element;
   wherein the inner and outer surfaces act as a light pipe to convey the light projected into the peripheral edge of the lens element through the lens element by means of multiple internal reflections off the inner and outer surfaces;
   wherein the partially reflective layer coated on the outer surface of the lens element partially reflects the light conveyed through the light pipe towards the inner surface and the light collimating film coated on the inner surface of the lens element controls a direction of the light reflected by the partially reflective layer towards the display area;
   wherein a portion of the light escapes from the inner surface of the lens element to illuminate the display area; and
   wherein the partially reflective layer coated on the outer surface of the lens element permits light from the illuminated display area to pass through the partially reflective layer so that the user can view the illuminated display area.

2. The display unit according to claim 1, wherein the partially reflective layer is partially reflecting to the light conveyed through the light pipe when incident on the outer surface and partially transmitting to light from the illuminated display area.

3. The display unit according to claim 1, wherein the light illuminating the display area includes ultraviolet light, and wherein the display area includes features that convert the ultraviolet light into visible light that passes through the partially reflective layer so that the user can view the features on the illuminated display area.

4. The display unit according to claim 1, wherein the inner and outer surfaces of the lens element are separated by a substantially constant distance.

5. The display unit according to claim 1, wherein the lens element is curved convexly relative to the display area.

6. The display unit according to claim 5, wherein the lens element is one of parabolic and elliptical.

7. The display unit according to claim 1, wherein the inner and outer surfaces of the lens element are smooth.

8. The display unit according to claim 1, wherein the lens element includes a fluorescent dye that absorbs the light conveyed through the light pipe and re-emits the light across a range of angles.

9. The display unit according to claim 1, wherein the outer surface of the lens element is micro-textured to scatter a portion of light incident on the outer surface.

10. The display unit according to claim 1, wherein the light collimating film is a light louver material.

11. The display unit according to claim 1, wherein the source of illumination is arranged to project light into opposite sections of the peripheral edge of the lens element.

12. The display unit according to claim 1, wherein the source of illumination includes a plurality of separate light sources.

13. The display unit according to claim 12, wherein the separate light sources are angled with respect to one another.

14. A display unit comprising:
   a display area for presenting visual information to a user of the display unit;
   a frame surrounding at least a portion of the display area;
   a source of illumination; and
   a lens element including opposite inner and outer surfaces relative to the display area and a peripheral edge held by the frame and adapted to receive light from the source of illumination, the inner surface coated with a light collimating film and the outer surface coated with a partially reflective layer to act as a light pipe to convey the light received from the source of illumination through the lens element, the lens element spaced from and extending across the display area, wherein the partially reflective layer coated on the outer surface of the lens element reflects the light conveyed through the lens element towards the inner surface and the light collimating film coated on the inner surface of the lens element controls a direction of the light reflected by the partially reflective reflecting layer towards the display area, at least a portion of the light escaping from the inner surface of the lens element to illuminate the display area; and wherein the partially reflective layer coated on the outer surface of the lens element permits light from the illuminated display area to pass through the partially reflective layer so that the user can view the illuminated display area.

15. The display unit according to claim 14, wherein the partially reflective layer is partially reflecting to the light conveyed from the source of illumination through the lens element when incident on the outer surface and partially transmitting to light from the illuminated display area.

16. The display unit according to claim 14, wherein the lens element is curved convexly relative to the display area.

17. The display unit according to claim 14, wherein the inner and outer surfaces of the lens element are smooth.

18. The display unit according to claim 14, wherein the outer surface of the lens element is micro-textured to scatter a portion of light incident on the outer surface.

19. The display unit according to claim 14, wherein the source of illumination includes a plurality of separate light sources.

20. A display unit comprising:
   a display area for presenting visual information to a user of the display unit, the display area including indicia disposed thereon;
   a frame surrounding at least a portion of the display area, an internal surface portion of the frame mirrored;
   a source of illumination including a plurality of light sources; and
   a lens element including opposite inner and outer surfaces relative to the display area and a peripheral edge held by the frame and adapted to receive light from the source of illumination, the inner surface coated with a light collimating film and the outer surface coated with a partially reflective layer to act as a light pipe to convey the light received from the source of illumination through the lens element, the lens element spaced from and extending across the display area, wherein the partially reflective layer coated on the outer surface of the lens element reflects the light conveyed through the lens element towards the inner surface and the light collimating film coated on the inner surface of the lens element controls a direction of the light reflected by the partially reflective layer towards the display area, at least a portion of the light escaping from the inner surface of the lens element to illuminate the display area; and wherein the partially reflective layer coated on the outer surface of the lens element permits light from the illuminated display area to pass through the partially reflective layer so that the user can view the illuminated display area.

\* \* \* \* \*